United States Patent [19]

Adachi

[11] Patent Number: 5,378,881
[45] Date of Patent: Jan. 3, 1995

[54] BAR CODE READER FOR ACCURATELY READING TWO-DIMENSIONAL BAR CODE IMAGES

[75] Inventor: Yutaka Adachi, Sagamihara, Japan

[73] Assignee: Olympus Optical Co., Ltd., Tokyo, Japan

[21] Appl. No.: 69,935

[22] Filed: May 28, 1993

[30] Foreign Application Priority Data

May 29, 1992 [JP] Japan .................................. 4-139412

[51] Int. Cl.⁶ .............................................. G06K 7/10
[52] U.S. Cl. .................................................... 235/462
[58] Field of Search ................... 235/462, 472; 382/24

[56] References Cited

U.S. PATENT DOCUMENTS 4,251,800  2/1981  Sanner ....................... 340/146.3 SY
5,134,272  7/1992  Tsuchiya ............................. 235/462

FOREIGN PATENT DOCUMENTS

0385478A2  9/1990  European Pat. Off. .

Primary Examiner—Davis L. Willis
Assistant Examiner—Karl D. Frech
Attorney, Agent, or Firm—Frishauf, Holtz, Goodman & Woodward

[57] ABSTRACT

A bar code reader includes an imaging element for recording a two-dimensional bar code, a frame memory for storing a two-dimensional bar code image recorded by the imaging element, and a bar code reading-control unit which finds coordinates of four corners of the two-dimensional bar code image stored in the frame memory, finds equations of four straight lines passing through four sides of the two-dimensional bar code image, sets a plurality of scan lines at equal intervals between those two of the four straight lines which cross two portions corresponding to start and end codes of the two-dimensional bar code image, and further sets a plurality of sampling lines at equal intervals between remaining two straight lines extending along the two portions, respectively, and samples the two-dimensional bar code image at positions corresponding to intersections between the scan lines and the sampling lines, whereby bar code information is read out from the two-dimensional bar code image.

3 Claims, 6 Drawing Sheets

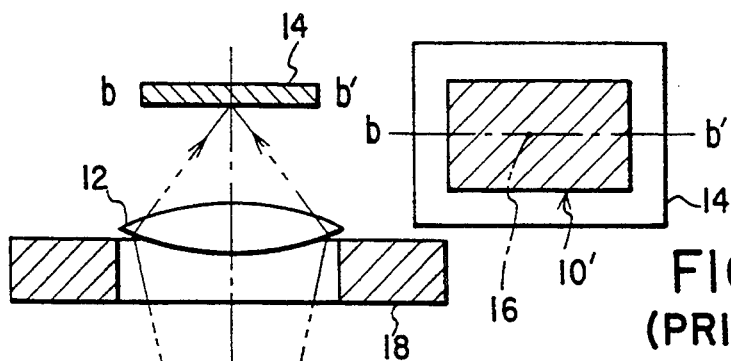
FIG. 6A (PRIOR ART)
FIG. 6B (PRIOR ART)
FIG. 6C (PRIOR ART)
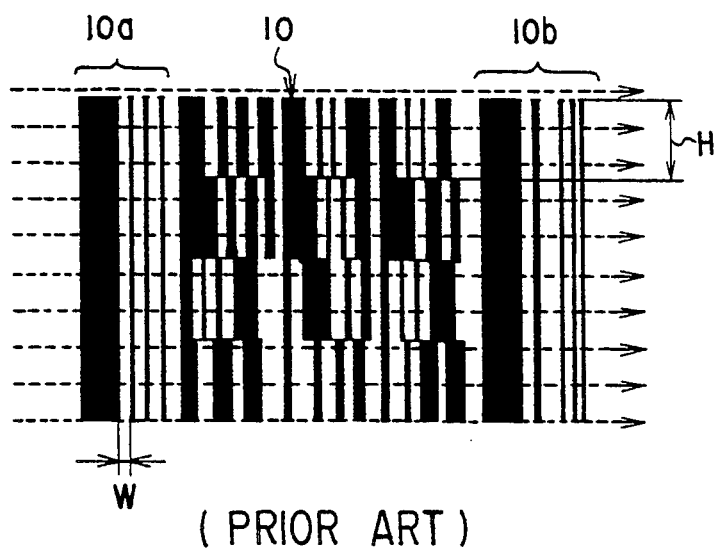
(PRIOR ART)
F I G. 7

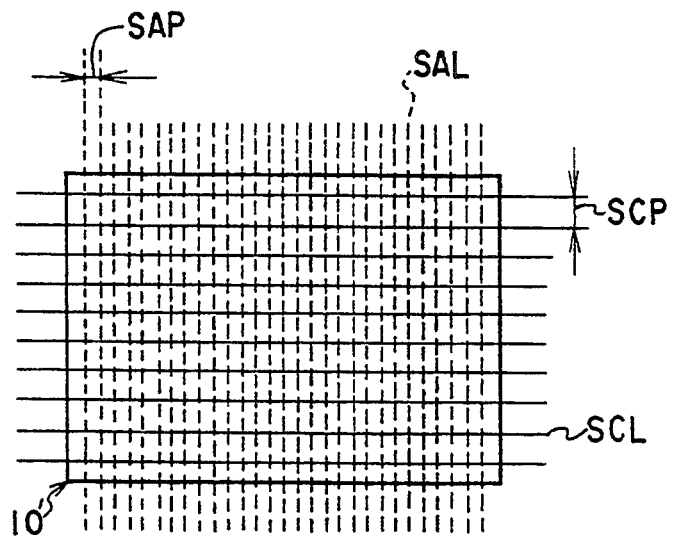
(PRIOR ART)
FIG. 8
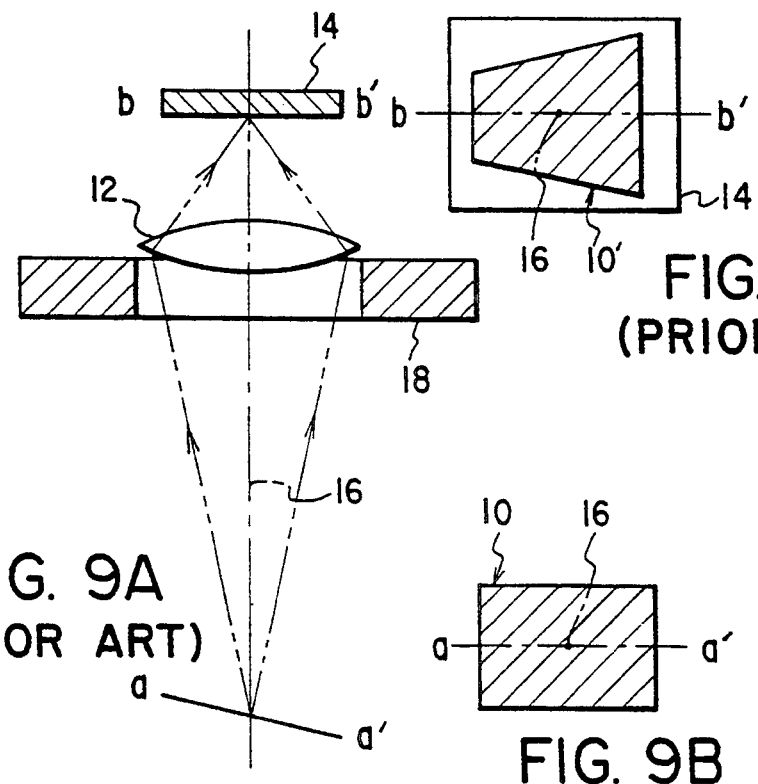
FIG. 9A
(PRIOR ART)
FIG. 9B
(PRIOR ART)
FIG. 9C
(PRIOR ART)

BAR CODE READER FOR ACCURATELY READING TWO-DIMENSIONAL BAR CODE IMAGES

BACKGROUND OF THE INVENTION

1. Field of the Invention

The present invention relates to a bar code reader which records a two-dimensional bar code by means of an imaging element and reads bar code information from the recorded bar code image.

"Code 16K", "Code 49", "PDF 417", "Data Code", etc. are known and in actual use as two-dimensional bar codes in which information is recorded in two-dimensional directions.

In general, a two-dimensional bar code is read by two methods. In one of the methods, the two-dimensional bar code is scanned with a laser beam in a predetermined pattern, and bar code information is read based on the intensity of reflected light from the bar code. In the other method, the two-dimensional bar code is recorded by means of an imaging element, such as a CCD (Charge Coupled Device), and the bar code image stored in a frame memory is electrically scanned or processed based on a software program to read out bar code information from the bar code.

FIG. 6A shows a schematic structure of a prior art image formation optical system incorporated in a bar code reader which employs an imaging element to read bar code information from a two-dimensional bar code.

The prior art image formation optical system comprises an image-formation lens 12 and an imaging element 14 (e.g., a CCD). The image-formation lens 12 is part of a TV camera, and this TV camera is supported by means of a supporting post such that it is located above an object on which a two-dimensional bar code 10 is printed or a bar code label showing the two-dimensional bar code 10 is adhered. The two-dimensional bar code 10 is located to cross an optical axis 16 of the image-formation lens 12 and imaging element 14.

Lighting means 18 for lighting the two-dimensional bar code 10 surrounds the image-formation lens 12.

In the prior art bar code reader mentioned above, the two-dimensional bar code 10 must be arranged substantially perpendicular to the optical axis 16 because of an adoption of a scan sampling method described later. FIG. 6B shows a plan view of a rectangular outline of the two-dimensional bar code 10 arranged substantially perpendicular to the optical axis 16, and FIG. 6C shows and an outline of a two-dimensional bar code image 10' formed on the imaging element 14. As can be seen from FIGS. 6B and 6C, the rectangular outline of the two-dimensional bar code 10 arranged substantially perpendicular to the optical axis 16, and the outline of the two-dimensional bar code image 10' formed on the imaging element 14 are of the same shape though they are different in size due to the magnification of the image-formation lens 12.

FIG. 7 shows "PDF 417" as one example of the two-dimensional bar code 10. As is shown in FIG. 7, the two-dimensional bar code 10 comprises by a start code 10a, a stop code 10b, and a plurality of bar code rows (four bar code rows in FIG. 7) sandwiched between the start and stop codes 10a, 10b. The start code 10a and the stop code 10b are at the respective ends of the two-dimensional bar code 10 in its width direction (i.e., a scan direction indicated by the dash lines in FIG. 7). The bar code rows are adjacent to one another, and the codes of each bar code row extends in a height direction of the two-dimensional bar code 10 (i.e., in the direction perpendicular to the scan direction).

FIG. 8 shows the scan sampling method for scanning the image 10' formed by the above-mentioned prior art bar code reader. The two-dimensional bar code image 10' (FIG. 6C) formed on the imaging element 14 is temporarily stored in a frame memory (not shown). Then, the two-dimensional bar code image 10' is scanned along a plurality of parallel scan lines SCL.

In order for each of bar code rows to be scanned at least once, the scan lines SCL are spaced equidistantly in the height direction of the two-dimensional bar code image 10' such that the scan pitch SCP is shorter than ½ of a height H (FIG. 7) of each of the bar code rows.

In order that a minimum bar and minimum space can be sampled in each of the scan lines SCL, each of the bar code rows is sampled by the sampling pitch SAP shorter than ½ of the width W (FIG. 7) of the minimum space of each of the bar code rows along the each scan line SCL. That is, the two-dimensional bar code image 10' is sampled at intersections between the scan lines SCL and sampling lines SAL equidistantly spaced with the sampling pitch SAP in the scan direction (i.e., the width direction) of the two-dimensional bar code 10.

Based on brightness information at an intersection at which the two-dimensional bar code image 10' is sampled, it is determined whether that intersection is a part of the bars or spaces, which are included in the bar code row along which the scan line SCL corresponding to the intersection passes. From bar/space arrangement information obtained by this determination, bar code information corresponding to the two-dimensional bar code 10 is read out.

If, in the prior art bar code reader mentioned above, the two-dimensional bar code 10 on the object (not shown) is greatly slanted with reference to the optical axis 16 of the image-formation optical system, as is shown in FIG. 9A, an outline of the two-dimensional bar code image 10' (FIG. 9C) formed on the imaging element 14 is distorted and has a different shape from an outline of the two-dimensional bar code 10 (FIG. 9B).

In this case, the scan sampling method, wherein the scan lines SCL and the sampling lines SAL cross each other at right angles, cannot read out bar code information on the basis of predetermined combinations of the bars and spaces of all the bar code rows of the distorted two-dimensional bar code image 10' of FIG. 9C.

SUMMARY OF THE INVENTION

The present invention has been derived from consideration of the above-circumstances, and its object is to provide a bar code reader which can accurately read bar code information from a two-dimensional bar code, even if this two-dimensional bar code is not arranged perpendicular to the optical axis of the image-formation optical system of the bar code reader and the two-dimensional bar code image formed on the imaging element is therefore distorted.

To achieve this object, a bar code reader according to the present invention comprises: an imaging element for recording a two-dimensional bar code; frame memory means for storing a two-dimensional bar code image recorded by means of the imaging element; and bar code reading-control means for finding coordinates of four corners of the two-dimensional bar code image stored in the frame memory means, for finding equations for four straight lines passing through four sides of the two-dimensional bar code image, for setting a plurality of scan lines at equal intervals between those two of the four straight lines which cross two portions corresponding to start and end codes of the two-dimensional bar code image and setting a plurality of sampling lines at equal intervals between the remaining two straight lines extending along the two portions, respectively, and for sampling the two-dimensional bar code image at positions corresponding to intersections between the scan lines and the sampling lines, whereby bar code information is read out from the two-dimensional bar code image.

In the bar code reader of the present invention having the above constitution, a distortion of the two-dimensional bar code image is detected by finding the gradients of the four straight lines passing through the four sides of the bar code image recorded by means of the imaging element, on the basis of the coordinates of the four corners. In accordance with the detected distortion of the bar code image, sampling lines are set at equal intervals between two of the four straight lines which cross two portions corresponding to start and end codes of the two-dimensional bar code image, and sampling pitch lines are set at equal intervals between the remaining two straight lines extending along the two portions. Bar code information is read on the basis of combinations of the bars and spaces of the bar codes contained in the distorted bar code image.

In the bar code reader characterized by the above construction, the bar code reading-control means can find the coordinates of the four corners of the two-dimensional bar code image stored in the frame memory means by scanning the frame memory means in two-dimensional directions.

Moreover, in the bar code reader characterized by the above construction, the bar code reading-control means can determine the scan lines as follows.

Where those segments of the latter two straight lines (i.e., the remaining straight lines extending along the two portions corresponding to the start and end codes) which are defined between the former two straight lines (i.e., the straight lines crossing the two portions corresponding to the start and end codes), are different in length, coordinates of points that equally divide the longer one of the segments are found, the member of the points being a predetermined number of the scan lines, and further the intersection of the former two straight lines is found. Straight lines extending between the intersection and the points equally dividing the longer segment are used as the scan lines.

Where those segments of the latter two straight lines which are defined between the former two straight lines are not different in length, coordinates of points that equally divide one of the segments are found, the number of the points being a predetermined number of the scan lines, and straight lines passing through the points in parallel to one of the former straight lines are used as the scan lines.

The bar code reading-control means can determine sampling lines as follows.

where those segments of the former two straight lines which are defined between the latter two straight lines are different in length, coordinates of points that equally divide the longer one of the segments are found, the number of the points being a predetermined number of the sampling lines, and further the intersection of the latter two straight lines is found. Straight lines extending between the intersection and the points equally dividing the longer segment are used as the sampling lines.

Where those segments of the former two straight lines which are defined between the latter two straight lines are not different in length, coordinates of points that equally divide one of the segments are found, the number of the points being a predetermined number of the sampling lines, and straight lines passing through the points in parallel to one of the latter straight lines are used as the sampling lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 6A–6C schematically show a conventional bar code reader system in a state that a two-dimensional bar code is arranged substantially perpendicular to an optical axis of an image-formation optical system of the conventional bar code reader;

FIG. 7 is a plan view showing an example of a two-dimensional bar code along with its scan direction;

FIG. 8 is a plan view showing a plurality of scan lines and a plurality of sampling lines, both set for the two-dimensional bar code shown in FIG. 7; and FIGS. 9A–9C schematically show the conventional bar code reader system of FIG. 6A in a state that the two-dimensional bar code is slanted with reference to the optical axis of the image-formation optical system of the conventional bar code reader.

DETAILED DESCRIPTION OF THE PREFERRED EMBODIMENTS

One embodiment of the present invention will now be described with reference to FIGS. 1 through 5C of the accompanying drawings.

Figure 1:
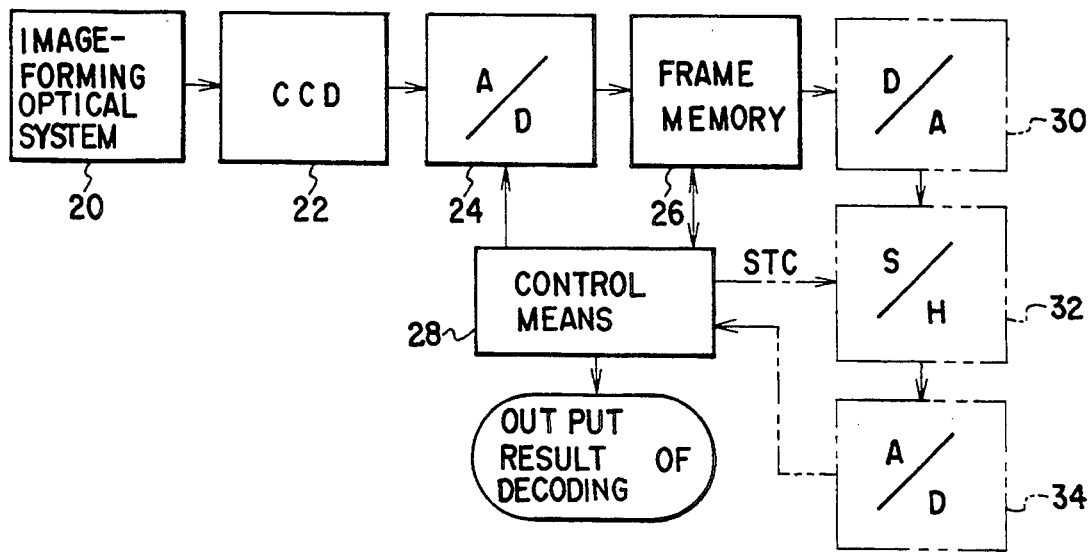
FIG. 1 is a block diagram schematically showing a construction of a bar code reader according to an embodiment of the present invention.

FIG. 1 shows a schematic construction of a bar code reader according to one embodiment of the present invention. Like the above-mentioned prior art bar code reader shown in FIG. 6A, the bar code reader of the illustrated embodiment of the present invention comprises a TV camera that is supported by means of a supporting post such that it is located above an object on which a two-dimensional bar code is printed or a label showing the two-dimensional bar code is adhered.

By means of an image-formation optical system 20, which includes an image-formation lens of a TV camera and is similar to the image-formation optical system shown in FIG. 6A, the two-dimensional bar code is recorded by an imaging element 22 which comprises a CCD, for example. The recorded two-dimensional bar code image is supplied to an analog/digital (A/D) converter 24, and is then stored in a frame memory 26. The A/D converter 24 and the frame memory 26 are connected to control means 28 (e.g., a CPU) and are properly controlled thereby.

The control means 28 can read out bar code information of the two-dimensional bar code by sampling data directly from the two-dimensional bar code image stored in the frame memory 26, according to the sampling procedures mentioned later and can decode the read bar code information.

As indicated by two-dot dash lines in FIG. 1, a digital/analog (D/A) converter 30, a sample/hold circuit 32 and an A/D converter 34 may be added to the bar code reader.

In the case where these structural elements are added, the stored data in the frame memory is supplied through the D/A converter 30 to the sample/hold circuit 32. In this sample/hold circuit 32, the data is sampled at sampling timings controlled by the control means 28 according to the sampling procedures mentioned later, whereby bar code information of the bar code is read out. The read out bar code information is supplied through the A/D converter 34 to the control means 28, and the control means 28 decodes the bar code information.

Figure 2:
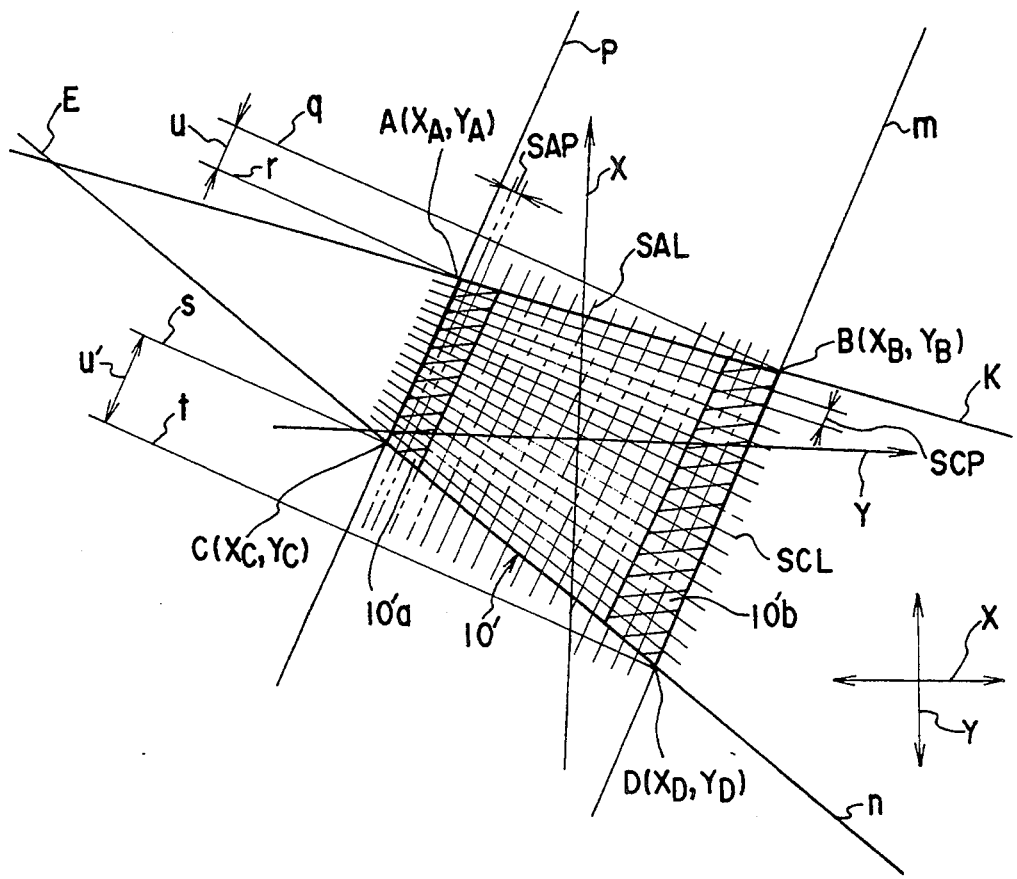
FIG. 2 is a view schematically showing scan lines and sampling lines set to make the bar code reader of the embodiment correctly read bar code information from a two-dimensional bar code image which is recorded by an imaging element of a TV camera in a distorted state and which is stored in a frame memory.

Now, a setting procedure for setting scan lines and sampling lines, used to correctly read out bar code information from a two-dimensional bar code image which is recorded by the imaging element 22 of the TV camera in a distorted state and which is stored in the frame memory 26 will be described, with reference to FIG. 2. It should be noted that FIG. 2 shows a two-dimensional bar code image imaginarily stored in the frame memory 26.

The number of memory cells in the frame memory 26 is the same as the number of imaging cells in the imaging element 22. An X-axis and a Y axis are arbitrarily determined with respect to the frame memory 26.

First, the frame memory 26 is scanned a large number of times in directions parallel to the directions (X and Y directions) in which the memory cells are arranged, so as to find coordinate-position data on the two-dimensional bar code image 10' stored in the frame memory 26. From the coordinate-position data, coordinates ($X_A$, $Y_A$), ($X_B$, $Y_B$), ($X_C$, $Y_C$) and ($X_D$, $Y_D$) of four corners A, B, C and D of the image 10' are found.

Then, on the basis of the coordinates ($X_A$, $Y_A$), ($X_B$, $Y_B$), ($X_C$, $Y_C$) and ($X_D$, $Y_D$), equations of four straight lines (hereinafter referred to as straight lines k, m, n and p) passing through the adjacent two corners (A, B), (B, D), (C, D) and (A, C) are found, as below.

At first, two binary equations are found by substituting the coordinate values for "X" and "Y" contained in the general formula of a straight line (i.e., $Y = aX + b$). Next, by solving the two binary equations, the values of a and b are found. Finally, the four equations (1)–(4) of the four straight lines are obtained as follows:

$$Y = a_k X + b_k \qquad (1)$$

$$Y = a_m X + b_m \qquad (2)$$

$$Y = a_n X + b_n \qquad (3)$$

$$Y = a_p X + b_p \qquad (4)$$

Subsequently, an intersection between each paired two opposite straight lines is found.

For example, in the distorted two-dimensional bar code image 10' shown in FIG. 2, a pair of straight lines k and n, which are not parallel to each other, intersect at point E, and the coordinates of this intersection E are obtained by forming simultaneous linear equations by use of formulas (2) and (4) and finding values of X and Y from the simultaneous linear equations.

It is assumed that the two-dimensional bar code is "PDF 417" described with reference to FIG. 7, and that a scan direction of the "PDF 417" is in parallel to the paired straight lines k and n (i.e., a direction crossing the start code 10'a and stop code 10'b of the image 10' of the "PDF 417"). Segments of the remaining paired straight lines p and n between the straight lines k and n are compared for their length with each other. With respect to the longer line segment (in FIG. 2, the line segment between corners B and D), coordinates of points which equally divide the line segment into parts corresponding to necessary scan pitches SCP are found. Further, equations of straight lines passing between each of these points and the intersection E are found. The equations of the straight lines, thus found, are used as equations of scan lines SCL of the distorted two-dimensional bar code image 10'.

In the distorted bar code image 10' shown in FIG. 2, straight lines p and m are parallel and do not intersect each other. In this case, equations of straight lines which are parallel to straight lines p and m and which equally divide a region between straight lines p and m into parts corresponding to necessary sampling pitches SAP, are found. The equations of the straight lines, thus found, are used as equations of sampling lines SAL of the distorted two-dimensional bar code image 10'.

In the case where the two-dimensional bar code image 10' is not very distorted, i.e., the case where only paired straight lines k and n intersect each other and where the longer one of distances u and u' is shorter than scan pitch SCP (distance u is the distance between straight lines q and r which pass through points B and A, respectively, and intersect straight lines p and m at right angles, while distance u' is the distance between straight lines s and t which pass through points C and D, respectively, and intersect straight lines p and m at right angles), a plurality of straight lines which are parallel to one of straight lines k and n and spaced apart at equal intervals corresponding to the scan pitch SCP may be used as the scan lines SCL.

In the case shown in FIG. 2, the two-dimensional bar code image 10' is distorted in such a manner that a pair of straight lines k and n, between which scan lines SCL are determined, intersect each other at point E. However, even when another pair of straight lines p and m intersect each other, sampling lines SAL can be determined therebetween such that each sampling line SAL passes through an intersection between the two straight lines p and m and divides a region between the two straight lines p and m into equal parts corresponding to the sampling pitch SAP.

In the case where the two-dimensional bar code image 10' is not very distorted (i.e., the case where only the paired straight lines p and m intersect each other and where the longer one of the distance between two straight lines which pass through points C and A, respectively, and which intersect straight lines k and n at right angles and the distance between two straight lines which pass through points D and B, respectively, and intersect straight lines k and n at right angles is shorter than the sampling pitch SAP), a plurality of straight lines which are parallel to one of the straight lines m and p and spaced apart at equal intervals corresponding to the sampling pitch SAP may be used as the sampling lines SAL.

Figure 3:
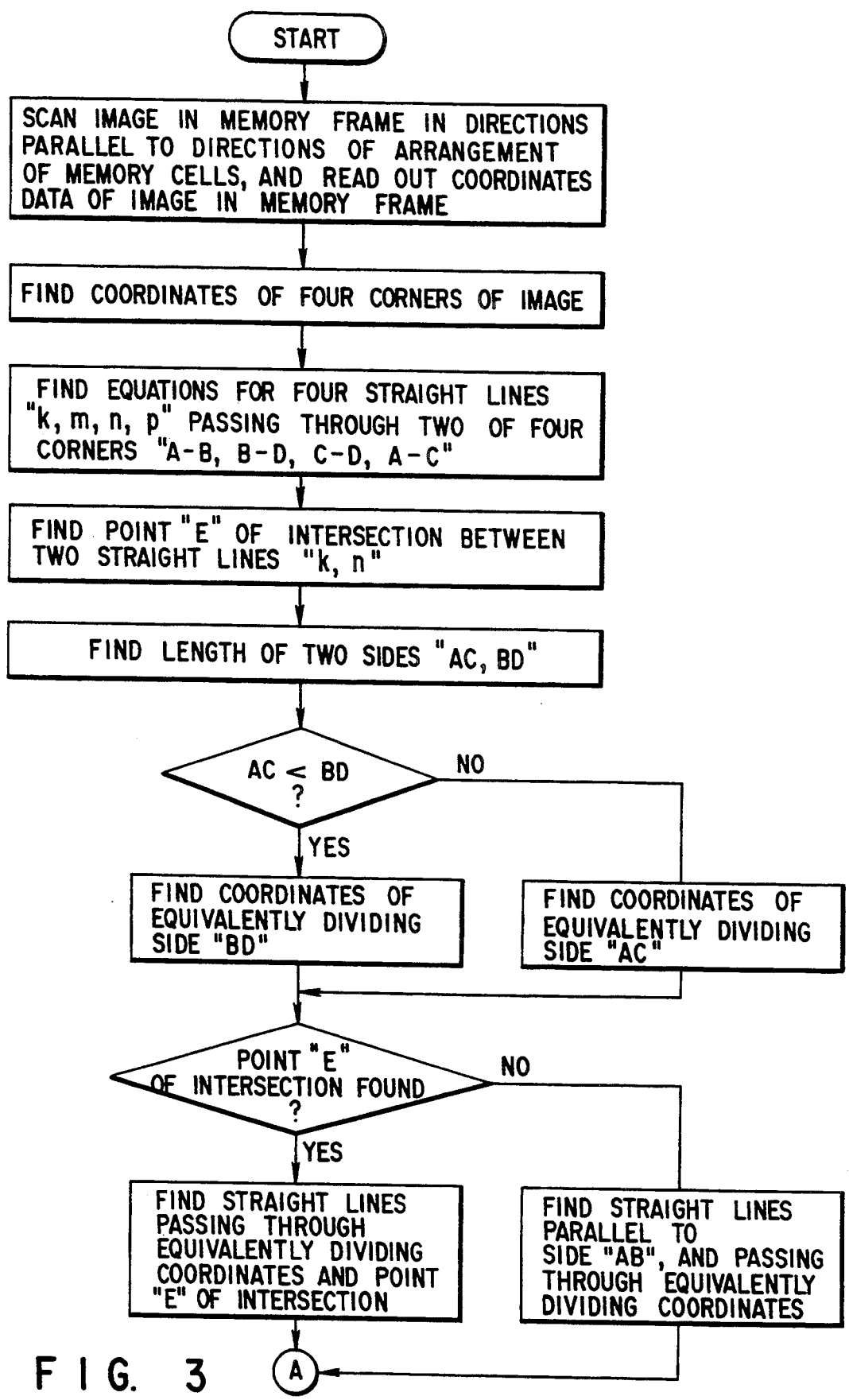
FIG. 3 is a flowchart schematically showing the former part of a setting procedure for setting the scan lines and sampling lines shown in FIG. 2.
Figure 4:
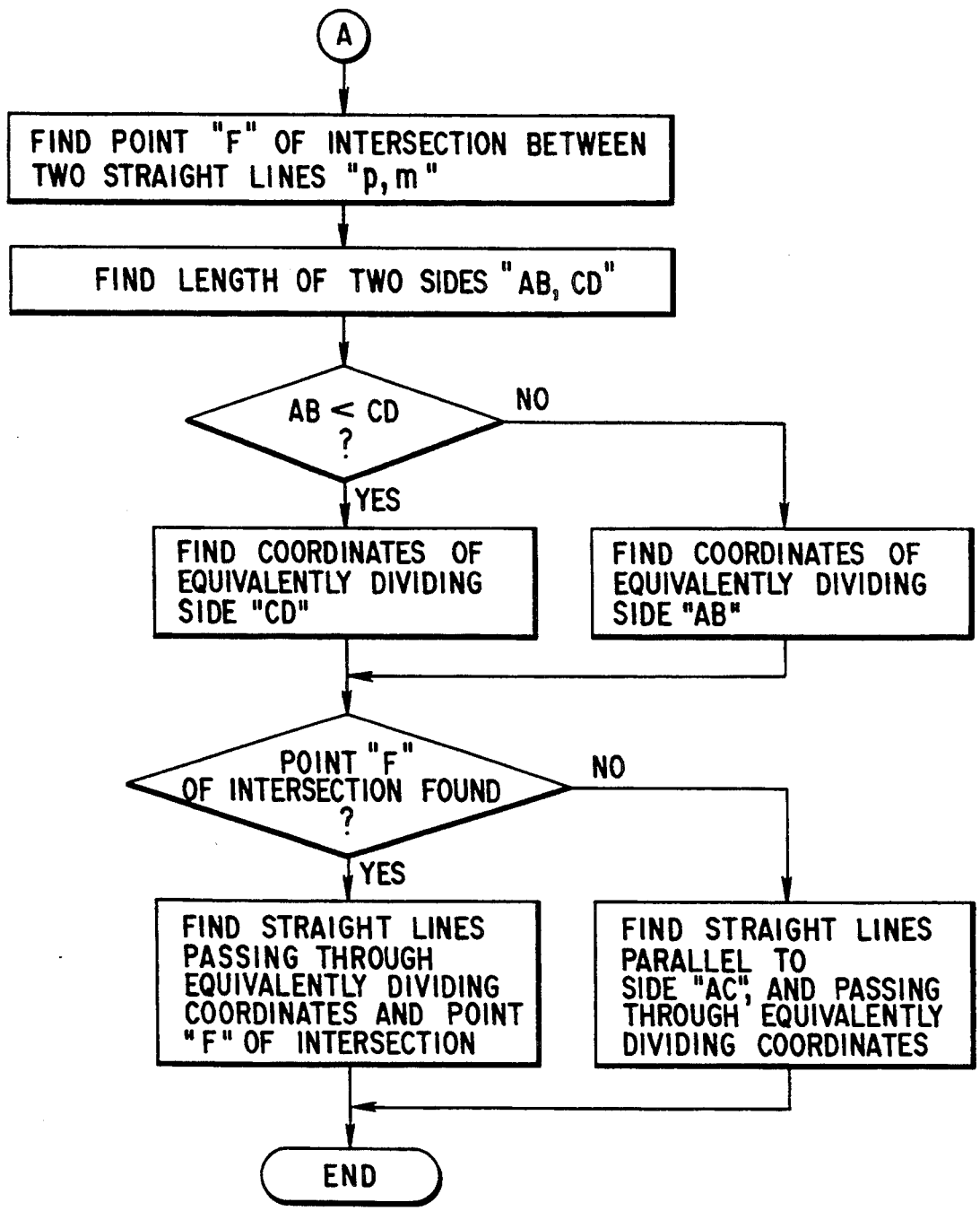
FIG. 4 is a flowchart showing the latter part of the setting procedure for setting the scan lines and sampling lines shown in FIG. 2.

FIGS. 3 and 4 are flowcharts which show how the scan lines SCL and sampling lines SAL described with reference to FIG. 2 are set.

Figure 5A:
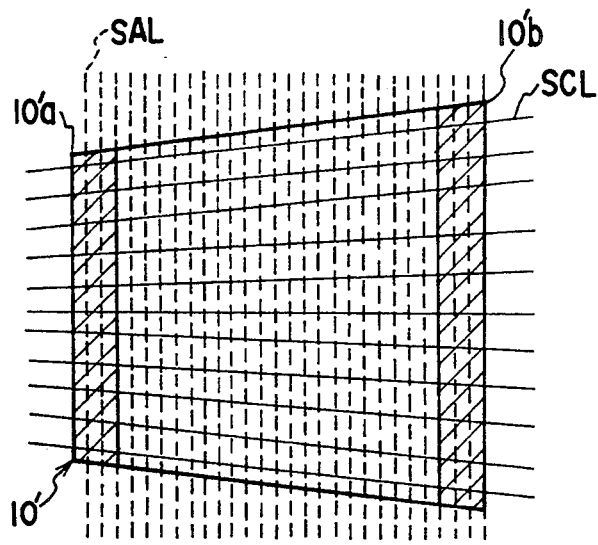
FIGS. 5A, 5B and 5C show how scan lines and sampling lines are set for two-dimensional bar code images which are stored in the bar code reader of the embodiment and which are distorted in different states.
Figure 5B:
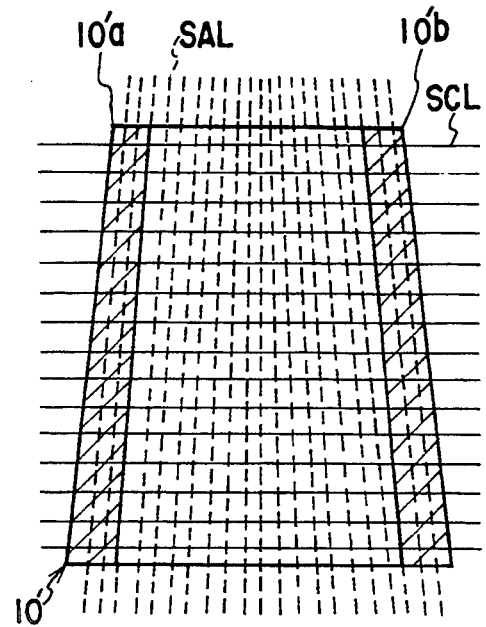
Figure 5C:
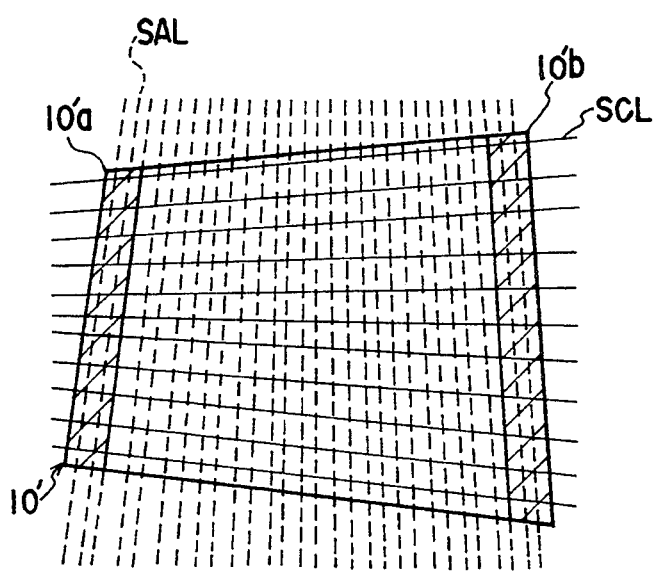

FIGS. 5A through 5C show scan lines SCL and sampling lines SAL which are set according to the above described procedures with respect to various distorted images 10' of the two-dimensional bar code, such as "PDF 417".

FIG. 5A shows a distorted bar code image 10' in which only the two straight lines extending along the scan lines SCL intersect each other. In the distorted bar code image 10' shown in FIG. 5A, parallel sampling lines SAL are spaced apart at intervals corresponding to a predetermined sampling pitch SAP, while radial scan lines SCL converging at one point, i.e. the intersection between the above described two straight lines, are spaced apart at intervals corresponding to a predetermined scan pitch SCP.

FIG. 5B shows a distorted bar code image 10' in which only the two straight lines extending along the sampling lines SAL intersect each other. In the distorted bar code image 10' shown in FIG. 5B, parallel scan lines SCL are spaced apart at intervals corresponding to a predetermined scan pitch SCL, while radial sampling lines SAL converging at one point, i.e. the intersection between the above described two straight lines, are spaced apart at intervals corresponding to a predetermined sampling pitch SAP.

FIG. 5C shows a distorted bar code image 10' in which the two straight lines extending along the scan lines SCL intersect each other and the two straight lines extending along the sampling lines SAL also intersect each other. In the distorted bar code image 10' shown in FIG. 5C, radial scan lines SCL converging at one point are spaced apart at intervals corresponding to a predetermined scan pitch SCP, and radial sampling lines SAL converging at one point are also spaced apart at intervals corresponding to a predetermined sampling pitch SAP.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bar code reader comprising:
   an imaging element for recording a two-dimensional bar code;
   frame memory means for storing a two-dimensional bar code image recorded by means of the imaging element; and
   bar code reading-control means for finding coordinates of four corners of the two-dimensional bar code image stored in the frame memory means, for finding equations of four straight lines passing through four sides of the two-dimensional bar code image, said four straight lines passing through respective corners of the two-dimensional bar code image stored in the frame memory means, for setting a plurality of scan lines at equal intervals between those two of the four straight lines which cross two portions corresponding to start and end codes of the two-dimensional bar code image, and further setting a plurality of sampling lines at equal intervals between remaining two straight lines extending along said two portions, respectively, and for sampling the two-dimensional bar code image at positions corresponding to intersections between the scan lines and the sampling lines, whereby bar code information is read out from the two-dimensional bar code image.

2. A bar code reader according to claim 1, wherein said bar code reading-control means finds the coordinates of the four corners of the two-dimensional bar code image stored in the frame memory means by scanning the frame memory means in two-dimensional directions.

3. A bar code reader according to claim 1, wherein:
   where those segments of the remaining two straight lines which extend along the two portions corresponding to the start and end codes of the two-dimensional bar code image and which are defined between the two straight lines crossing the two portions, are different in length, said bar code reading-control means determines the scan lines by: finding coordinates of points that equally divide a longer segment, the number of the points being a predetermined number of the scan lines; finding an intersection of the two straight lines crossing the two portions; and finding straight lines which connect the intersection and the points equally dividing the longer segment;
   where those segments of the straight lines which extend along the two portions and which are defined between the two straight lines crossing the two portions, are equal in length, said bar code reading-control means determines the scan lines by: finding coordinates of points that equally divide one of the segments, the number of the points being a predetermined number of the scan lines; and finding straight lines passing through the points in parallel to one of the straight lines crossing the two portions;
   where those segments of the straight lines which cross the two portions and which are defined between the two straight lines extending along the two portions, are different in length, said bar code reading-control means determines the sampling lines by: finding coordinates of points that equally divide a longer segment, the number of the points being a predetermined number of the sampling lines; finding an intersection of the two straight lines extending along the two portions; and finding straight lines which connect the intersection and the points equally dividing the longer segment; and where those segments of the straight lines which cross the two portions and which are defined between the two straight lines extending along the two portions, are equal in length, said bar code reading-control means determines the sampling lines by: finding coordinates of points that equally divide one of the segments, the number of the points being a predetermined number of the sampling lines; and finding straight lines passing through the points in parallel to one of the straight lines extending along the two portions.

* * * * *